(12) United States Patent
Jiang

(10) Patent No.: US 12,179,820 B1
(45) Date of Patent: Dec. 31, 2024

(54) FOLDING CART

(71) Applicant: Zhongshan Kanglaiya Trading Co., Ltd., Zhongshan (CN)

(72) Inventor: Zelian Jiang, Zhongshan (CN)

(*) Notice: Subject to any disclaimer, the term of this patent is extended or adjusted under 35 U.S.C. 154(b) by 0 days.

(21) Appl. No.: 18/787,624

(22) Filed: Jul. 29, 2024

(51) Int. Cl.
*B62B 3/02* (2006.01)

(52) U.S. Cl.
CPC ................... *B62B 3/025* (2013.01)

(58) Field of Classification Search
CPC ............... B62B 3/025; B62B 3/007
See application file for complete search history.

(56) References Cited

U.S. PATENT DOCUMENTS

| | | | |
|---|---|---|---|
| 9,896,118 B2* | 2/2018 | Choi | B62B 3/007 |
| 10,464,588 B1* | 11/2019 | Lin | B62B 7/08 |
| 11,091,183 B2* | 8/2021 | Wu | B62B 3/007 |
| 11,465,664 B1* | 10/2022 | Choi | B62B 3/025 |
| 11,958,520 B1* | 4/2024 | Sun | B62B 5/067 |
| 11,981,364 B2* | 5/2024 | Ma | B62B 5/0461 |
| 2023/0219608 A1* | 7/2023 | Jiang | B62B 3/025 280/651 |
| 2024/0190492 A1* | 6/2024 | Frankel | B62B 3/007 |

FOREIGN PATENT DOCUMENTS

| | | | | |
|---|---|---|---|---|
| CN | 117842156 A | | 4/2024 | |
| CN | 220996447 U | | 5/2024 | |
| CN | 221090876 U | | 6/2024 | |
| CN | 221251293 U | | 7/2024 | |
| EP | 4180348 A1 | * | 5/2023 | ............ B62B 3/025 |
| GB | 2579891 A | * | 7/2020 | ............ B62B 3/007 |
| JP | H06278613 A | * | 10/1994 | ............ B62B 3/025 |
| WO | WO-2021027808 A1 | * | 2/2021 | |
| WO | WO-2021257824 A1 | * | 12/2021 | ............ B62B 3/007 |
| WO | WO-2024165976 A1 | * | 8/2024 | ............ B62B 3/025 |

* cited by examiner

*Primary Examiner* — Katy M Ebner

(57) ABSTRACT

The present application provides a folding cart. Inclined rods are added between top rods and bottom rods, so that a supporting strength between the top rods and the bottom rods can be increased. The inclined rods are slidably connected to the bottom rods or a frame, so that stability of folding deformation is improved. According to the present application, an overall structural strength and folding stability of a side frame are improved, use requirements of users can be met to the greatest extent.

15 Claims, 8 Drawing Sheets

FOLDING CART

CROSS-REFERENCE TO RELATED APPLICATIONS

The present application claims priority to Chinese Patent Application No. 2024210521061, filed May 14, 2024, the entire disclosure of which is incorporated herein by reference.

TECHNICAL FIELD

The present invention relates to the technical field of carts, and in particular, to a folding cart.

BACKGROUND

Folding carts are favored by consumers because of their characteristics of being foldable and easy to carry and store. However, the foldable structural design inevitably leads to the structural strength being inferior to that of rigidly connected carts. For example, the patent (No. CN216374594U) discloses a folding cart, which includes a bottom support, at least two groups of side supports and a plurality of supporting rods. The plurality of supporting rods are vertically arranged and located at an edge of the folding cart, and the bottom support is movably connected to the supporting rods. The structural strength and stability of the side supports of the folding cart are poor. It is of great significance to improve the structural strength and load-bearing capacity of the folding cart to meet use requirements of consumers to the greatest extent.

SUMMARY

Against the technical problems of poor structural strength and stability of an existing folding cart, the present application provides a folding cart, to improve an overall structural strength and folding stability of a side frame and meet use requirements of users to the greatest extent.

The present application adopts the following technical solutions:

A folding cart includes a front frame and a rear frame that are arranged in a front-rear manner and a side frame arranged therebetween for unfolding and folding, where the side frame includes a front top rod, a front bottom rod, a rear top rod and a rear bottom rod, front ends of the front top rod and the front bottom rod are pivoted to an upper side and a lower side of the front frame respectively, rear ends of the rear top rod and the rear bottom rod are pivoted to an upper side and a lower side of the rear frame respectively, a rear side of the front top rod is pivoted to a front side of the rear top rod, and a rear side of the front bottom rod is pivoted to a front side of the rear bottom rod; and the side frame further includes a front inclined rod and a rear inclined rod;

an upper end of the front inclined rod is hinged between the front top rod and the rear top rod, and a lower end thereof is slidably connected to the front frame or the front bottom rod; and an upper end of the rear inclined rod is hinged between the front top rod and the rear top rod, and a lower end thereof is slidably connected to the rear frame or the rear bottom rod.

In the folding cart as described above, the side frame further includes a front supporting rod and a rear supporting rod;

an upper end of the front supporting rod is hinged to a middle portion of the front inclined rod, and a lower end thereof is slidably connected to the front bottom rod; and an upper end of the rear supporting rod is hinged to a middle portion of the rear inclined rod, and a lower end thereof is slidably connected to the rear bottom rod.

In the folding cart as described above, the cart further includes an upper hinge seat arranged between the front top rod and the rear top rod, where a front end of the upper hinge seat is hinged to a rear end of the front top rod, a rear end of the upper hinge seat is hinged to a front end of the rear top rod, and the upper ends of the front inclined rod and the rear inclined rod are hinged to the upper hinge seat.

In the folding cart as described above, a connecting member is arranged on a lower side of the upper hinge seat, and the upper hinge seat is hinged to the upper ends of the front inclined rod and the rear inclined rod through the connecting member.

In the folding cart as described above, the connecting member is inversely T-shaped, and a front end of the connecting member is hinged to the upper end of the front inclined rod, and a rear end thereof is hinged to an upper end of the rear top rod.

In the folding cart as described above, the upper ends of the front inclined rod and the rear inclined rod are sequentially hinged to a middle portion of the upper hinge seat.

In the folding cart as described above, when the folding cart is folded from an unfolded state to a folded state, the upper ends of the front inclined rod and the rear inclined rod rotate around a hinge until ends thereof away from the hinge gradually approach downward.

In the folding cart as described above, when the folding cart is in an unfolded state, the front top rod, the rear top rod and the upper hinge seat are all transversely arranged; and when the folding cart is folded from an unfolded state to a folded state, the front top rod and the rear top rod are vertically arranged, and the upper hinge seat is kept transversely arranged.

In the folding cart as described above, a front sliding seat is hinged to a lower end of the front inclined rod, and the front sliding seat is sleeved on the front bottom rod and can slide along the front bottom rod; and a rear sliding seat is hinged to a lower end of the rear inclined rod, and the rear sliding seat is sleeved on the rear bottom rod and can slide along the rear bottom rod.

In the folding cart as described above, when the folding cart is in an unfolded state, the front supporting rod is vertically connected between the front inclined rod and the front bottom rod, and the rear supporting rod is vertically connected between the rear inclined rod and the rear bottom rod.

The embodiments of the present invention have the following beneficial effects.

The present application provides a folding cart. Inclined rods are added between top rods and bottom rods, so that a supporting strength between the top rods and the bottom rods can be increased. The inclined rods are slidably connected to the bottom rods or a frame, so that stability of folding deformation is improved. According to the present application, an overall structural strength and folding stability of a side frame are improved, use requirements of users can be met to the greatest extent.

BRIEF DESCRIPTION OF THE DRAWINGS

To describe the technical solutions in the embodiments of the present application more clearly, the following briefly describes the accompanying drawings required for describing the embodiments. Apparently, the accompanying drawings in the following description show merely some embodiments of the present application, and those of ordinary skill in the art may still derive other accompanying drawings from these accompanying drawings without creative efforts.

DETAILED DESCRIPTION

Figure 1:
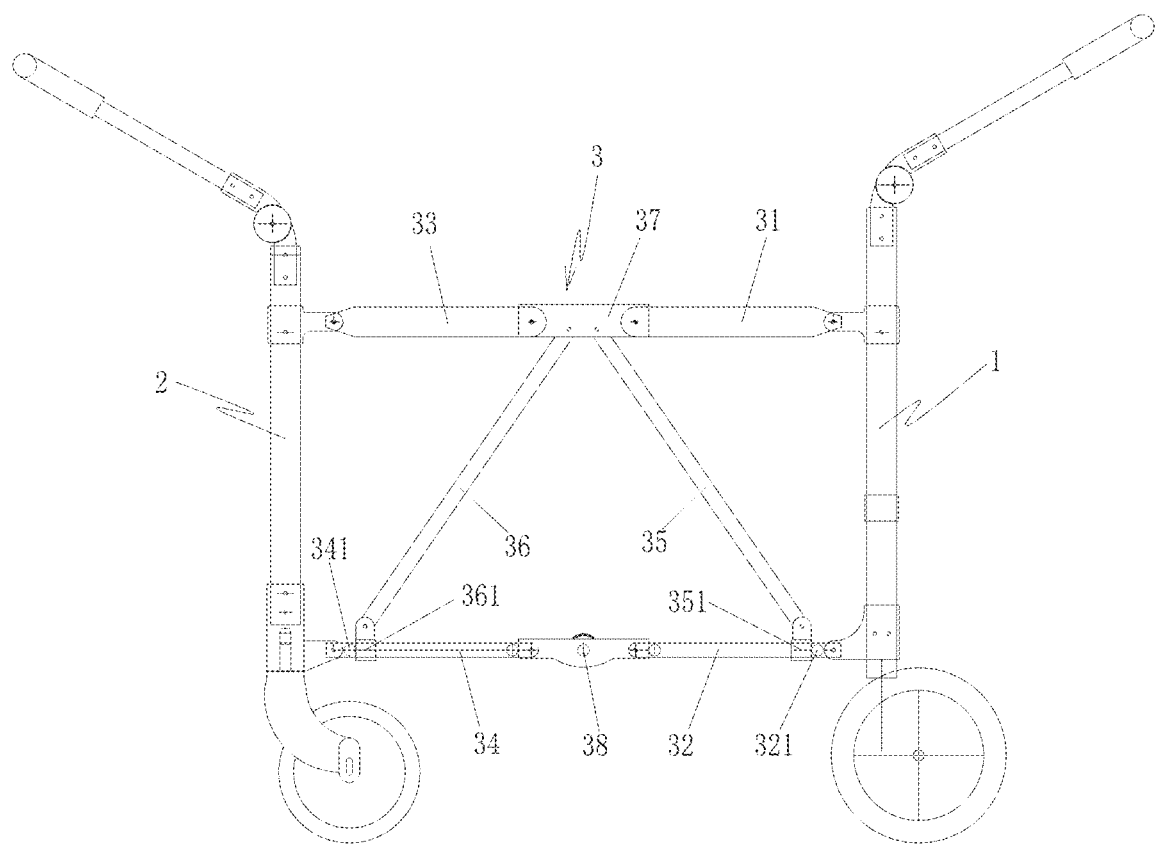
FIG. 1 is a schematic structural diagram of a folding cart in an unfolded state according to Embodiment 1 of the present application.

The technical solutions of the embodiments of the present invention are clearly and completely described below with reference to the accompanying drawings in the embodiments of the present invention. Apparently, the described embodiments are merely some rather than all of the embodiments of the present invention. All other embodiments obtained by those of ordinary skill in the art based on the embodiments of the present invention without creative efforts shall fall within the protection scope of the present invention.

As shown in FIGS. 1 to 8, a folding cart includes a front frame 1 and a rear frame 2 that are arranged in a front-rear manner and a side frame 3 arranged therebetween for unfolding and folding. The side frame 3 includes a front top rod 31, a front bottom rod 32, a rear top rod 33 and a rear bottom rod 34. Front ends of the front top rod 31 and the front bottom rod 32 are pivoted to an upper side and a lower side of the front frame 1 respectively. Rear ends of the rear top rod 33 and the rear bottom rod 34 are pivoted to an upper side and a lower side of the rear frame 2 respectively. A rear side of the front top rod 31 is pivoted to a front side of the rear top rod 33. A rear side of the front bottom rod 32 is pivoted to a front side of the rear bottom rod 34. The side frame 3 further includes a front inclined rod 35 and a rear inclined rod 36.

An upper end of the front inclined rod 35 is hinged between the front top rod 31 and the rear top rod 33, and a lower end thereof is slidably connected to the front frame 1 or the front bottom rod 32.

An upper end of the rear inclined rod 36 is hinged between the front top rod 31 and the rear top rod 33, and a lower end thereof is slidably connected to the rear frame 2 or the rear bottom rod 34.

The present application provides a folding cart. Inclined rods are added between top rods and bottom rods, so that a supporting strength between the top rods and the bottom rods can be increased. The inclined rods are slidably connected to the bottom rods or a frame, so that stability of folding deformation is improved. According to the present application, an overall structural strength and folding stability of a side frame are improved, use requirements of users can be met to the greatest extent.

Further, the side frame 3 further includes a front supporting rod 3a and a rear supporting rod 3b.

An upper end of the front supporting rod 3a is hinged to a middle portion of the front inclined rod 35, and a lower end thereof is slidably connected to the front bottom rod 32.

An upper end of the rear supporting rod 3b is hinged to a middle portion of the rear inclined rod 36, and a lower end thereof is slidably connected to the rear bottom rod 34.

Further, the folding cart further includes an upper hinge seat 37 arranged between the front top rod 31 and the rear top rod 33. A front end of the upper hinge seat 37 is hinged to a rear end of the front top rod 31. A rear end of the upper hinge seat 37 is hinged to a front end of the rear top rod 33. The upper ends of the front inclined rod 35 and the rear inclined rod 36 are hinged to the upper hinge seat 37. According to the present application, the front top rod 31 is hinged to the rear top rod 33 by using the upper hinge seat 37, which facilitates folding. Further preferably, a cross section of the upper hinge seat 37 is inversely n-shaped, and a front side and a rear side of the upper hinge seat are sleeved on end portions of the front top rod 31 and the rear top rod 33 respectively, so that the hinging is more stable. The folding cart can be kept transverse when unfolded, thereby improving the overall structural strength. The upper ends of the front inclined rod 35 and the rear inclined rod 36 are hinged to the upper hinge seat 37, so that when the folding cart is in an unfolded state, the front inclined rod 35 and the rear inclined rod 36 are relatively inclined, thereby improving the overall structural strength of the side frame.

Figure 2:
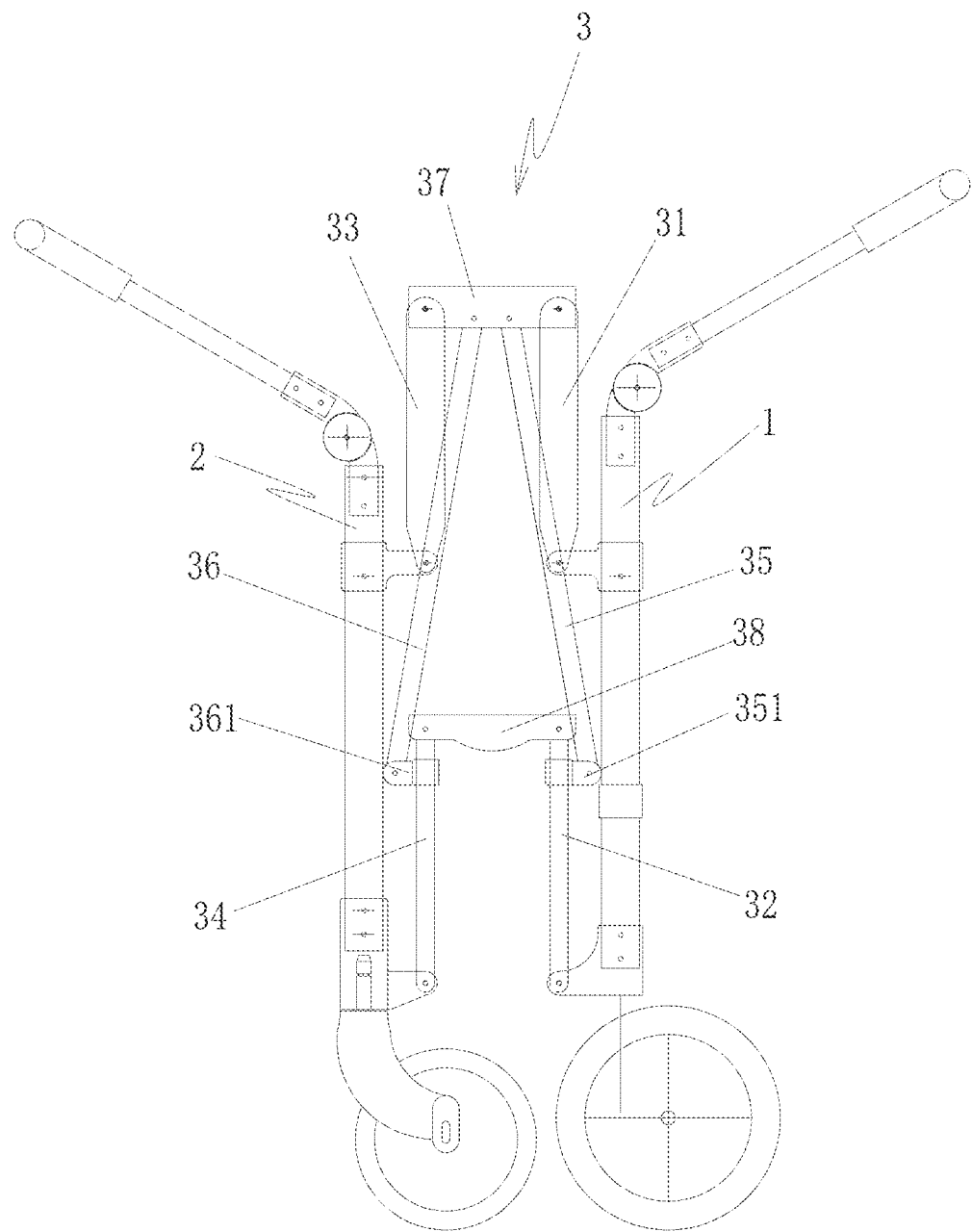
FIG. 2 is a schematic structural diagram of the folding cart in a folded state according to Embodiment 1 of the present application.

As a preferred implementation, referring to Embodiment 1 of FIGS. 1 to 2 of the present application, an upper end of the front inclined rod 35 is hinged between the front top rod 31 and the rear top rod 33, and a lower end thereof is slidably connected to the front bottom rod 32; and an upper end of the rear inclined rod 36 is hinged between the front top rod 31 and the rear top rod 33, and a lower end thereof is slidably connected to the rear bottom rod 34.

Figure 3:
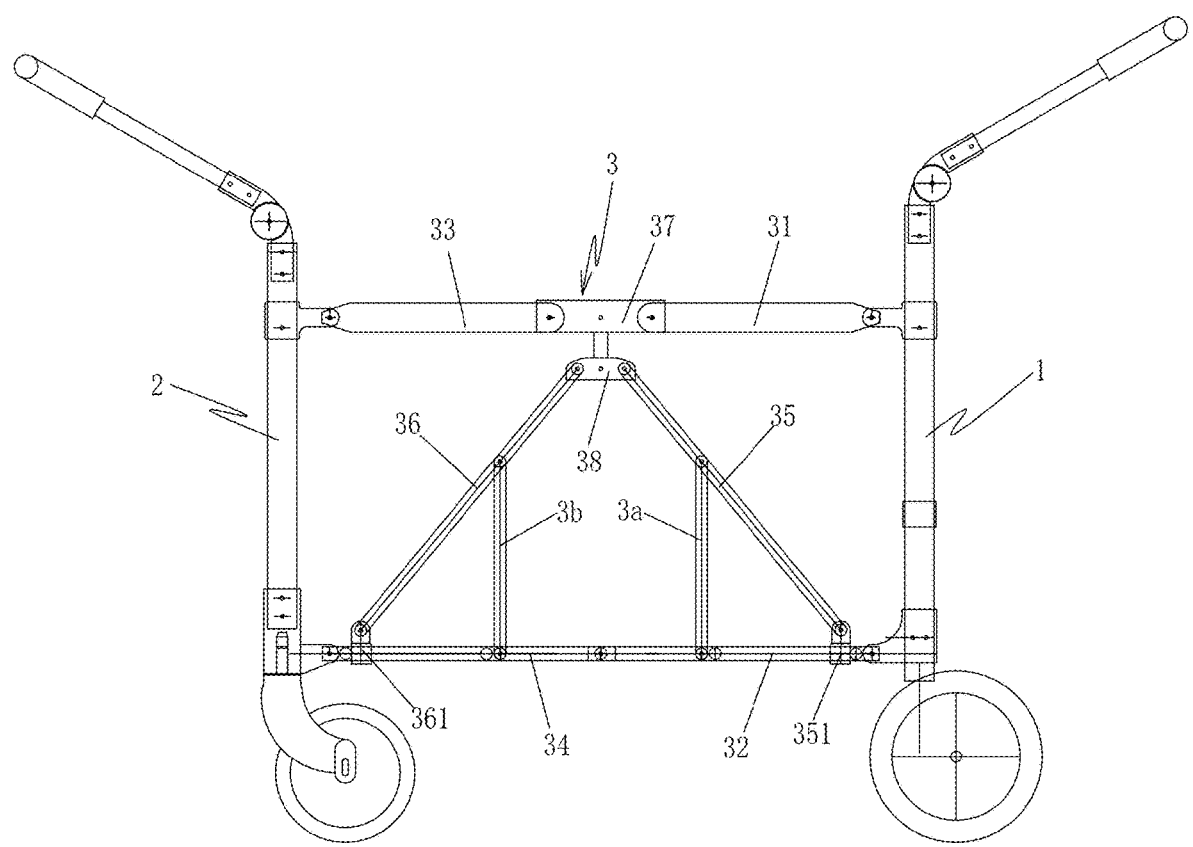
FIG. 3 is a schematic structural diagram of a folding cart in an unfolded state according to Embodiment 2 of the present application.
Figure 4:
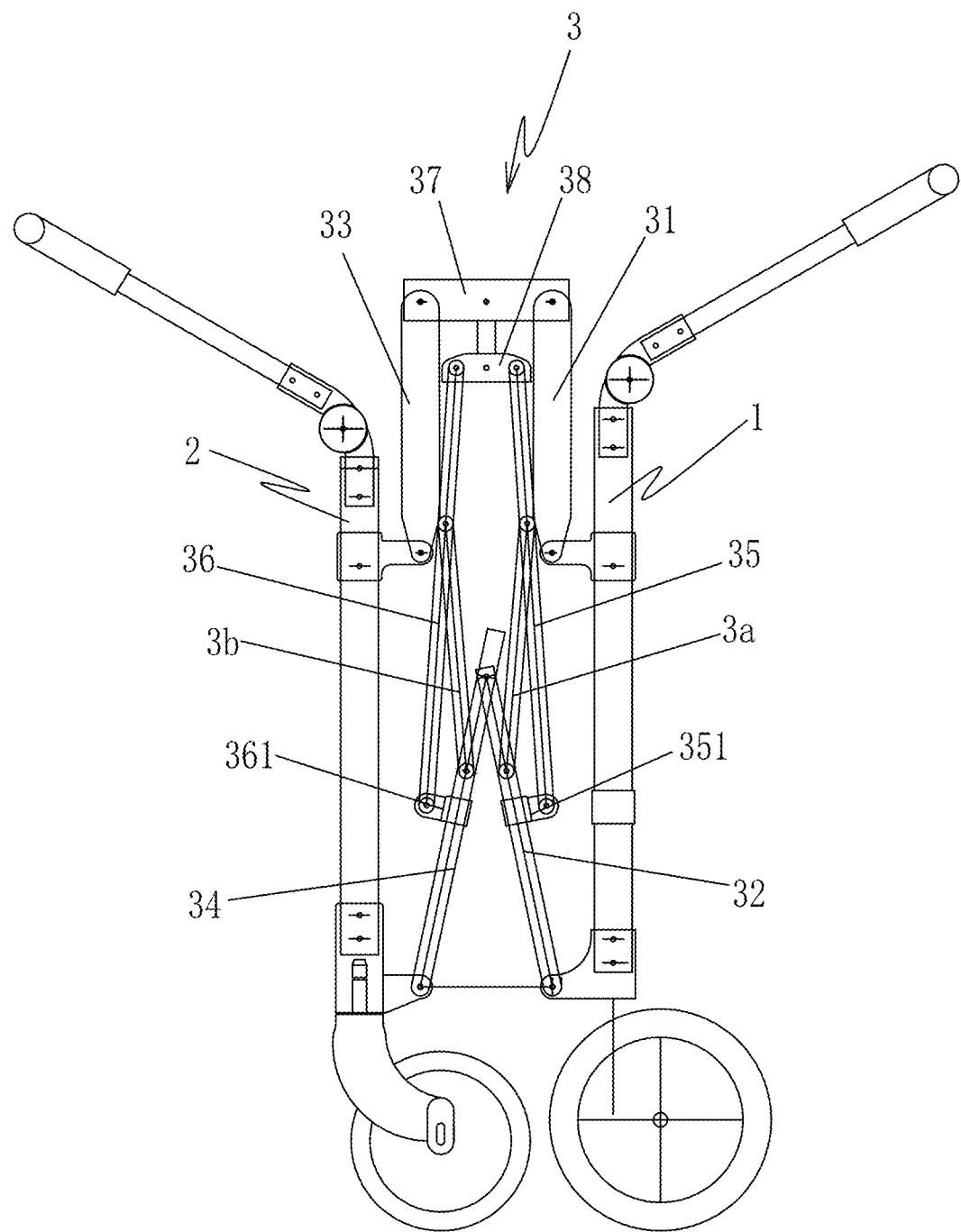
FIG. 4 is a schematic structural diagram of the folding cart in a folded state according to Embodiment 2 of the present application.

As a preferred implementation, referring to Embodiment 2 of FIGS. 3 to 4 of the present application, a connecting member 38 is arranged on a lower side of the upper hinge seat 37, and further preferably, the connecting member 38 is inversely T-shaped. A front end of the connecting member 38 is hinged to the upper end of the front inclined rod 35, and a rear end thereof is hinged to an upper end of the rear top rod 33. The structure in this design is reasonable, and the front inclined rod 35 and the rear inclined rod 36 rotate smoothly during folding, thereby achieving high folding stability.

Figure 5:
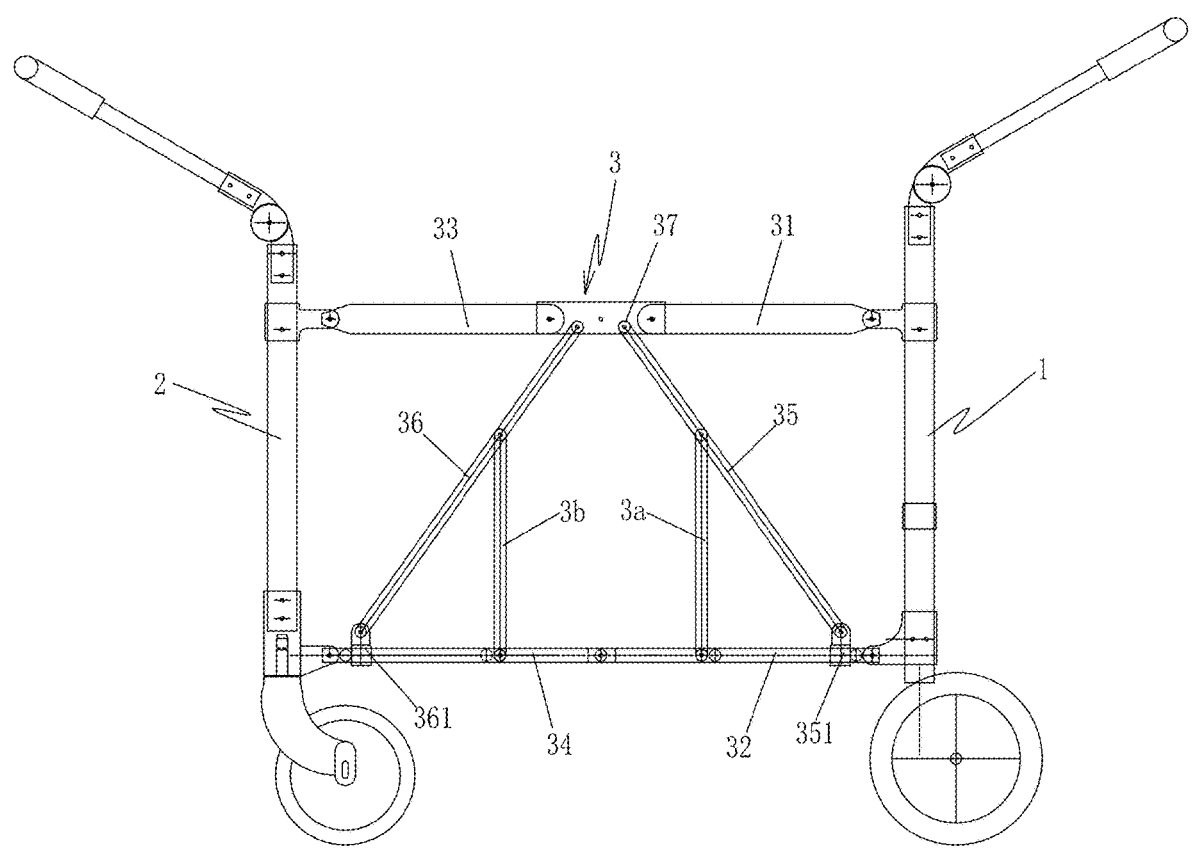
FIG. 5 is a schematic structural diagram of a folding cart in an unfolded state according to Embodiment 3 of the present application.
Figure 6:
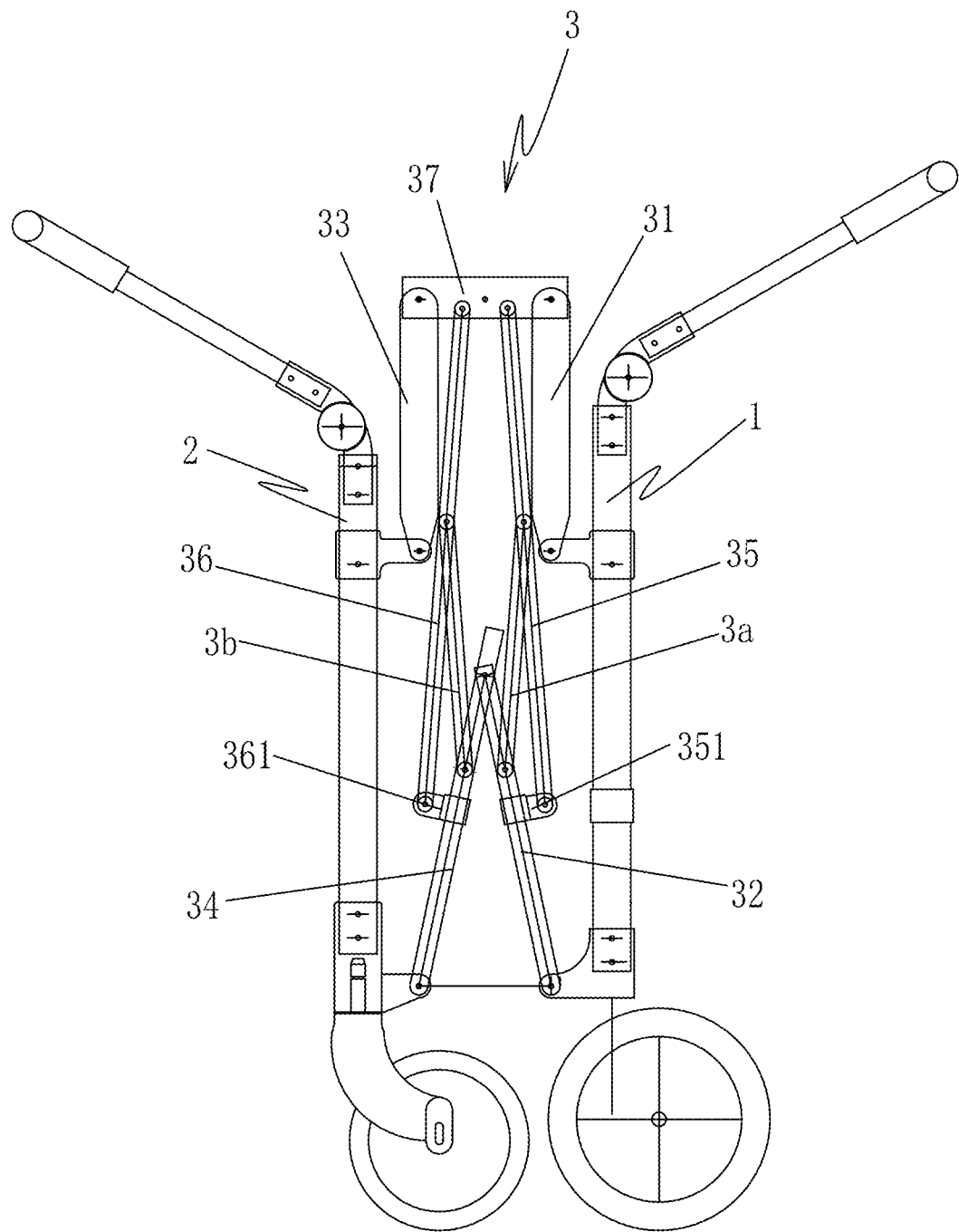
FIG. 6 is a schematic structural diagram of the folding cart in a folded state according to Embodiment 3 of the present application.

As another preferred implementation, referring to Embodiment 3 of FIGS. 5 to 6 of the present application, the upper ends of the front inclined rod 35 and the rear inclined rod 36 are sequentially hinged to a middle portion of the upper hinge seat 37. The upper ends of the front inclined rod 35 and the rear inclined rod 36 in the present application are located between the front top rod 31 and the rear top rod 33. This structure is simple and convenient to fold, and can support the top rods and the bottom rods when unfolded, thereby improving the overall structural strength of the folding cart.

Figure 7:
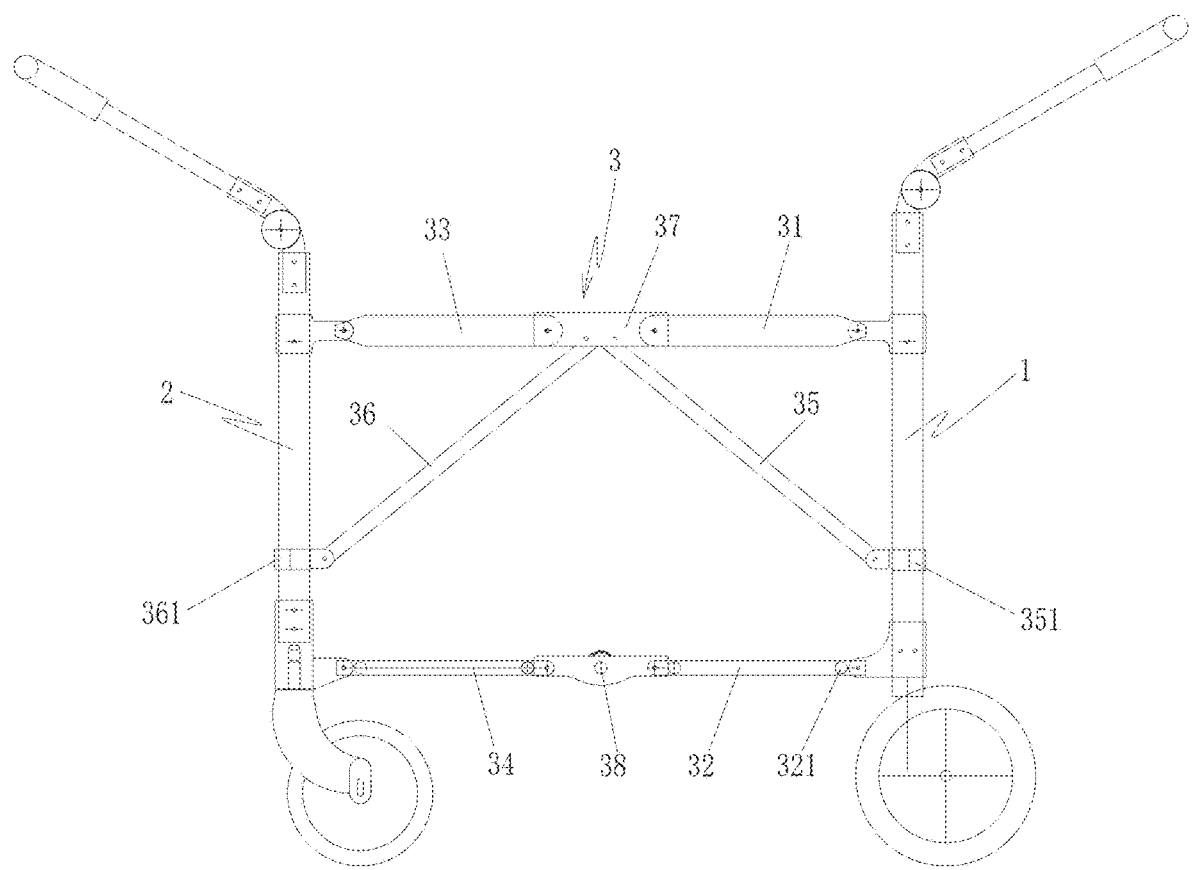
FIG. 7 is a schematic structural diagram of a folding cart in an unfolded state according to Embodiment 4 of the present application.

As another preferred implementation, referring to Embodiment 4 of FIG. 7 of the present application, lower ends of the front inclined rod 35 and the rear inclined rod 36 are slidably connected to the front frame 1 and the rear frame 2 respectively, and the upper ends of the front inclined rod 35 and the rear inclined rod 36 in the present application are located between the front top rod 31 and the rear top rod 33. This structure is simple and convenient to fold, and can support the top rods and the bottom rods when unfolded, thereby improving the overall structural strength of the folding cart.

Figure 8:
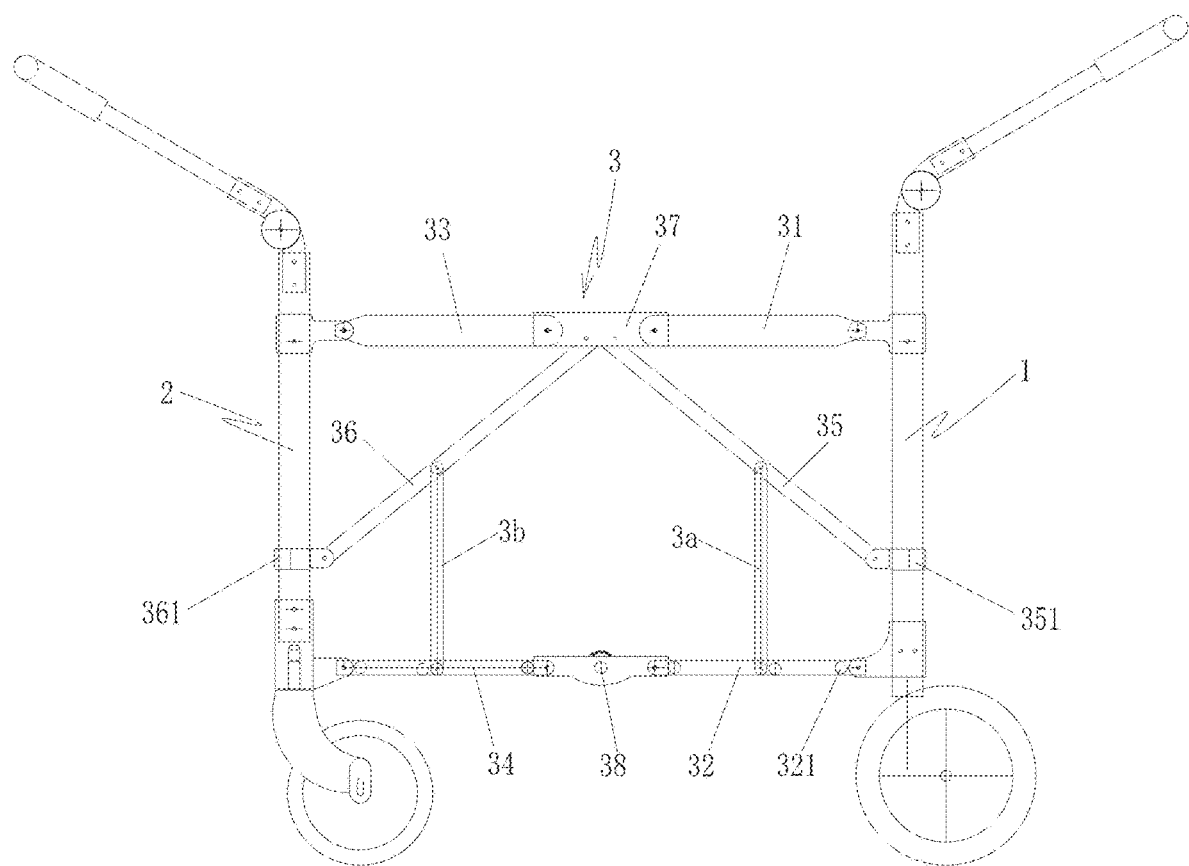
FIG. 8 is a schematic structural diagram of a folding cart in an unfolded state according to Embodiment 5 of the present application.

As another preferred implementation, referring to Embodiment 5 of FIG. 8 of the present application, lower ends of the front inclined rod 35 and the rear inclined rod 36 are slidably connected to the front frame 1 and the rear frame 2 respectively, and an upper end of the front supporting rod 3a is hinged to a middle portion of the front inclined rod 35, and a lower end thereof is slidably connected to the front bottom rod 32; and an upper end of the rear supporting rod 3b is hinged to a middle portion of the rear inclined rod 36, and a lower end thereof is slidably connected to the rear bottom rod 34. This structure in the present application is simple and convenient to fold, and can support the top rods and the bottom rods when unfolded, thereby improving the overall structural strength of the folding cart.

Further, when the folding cart is folded from an unfolded state to a folded state, the upper ends of the front inclined rod 35 and the rear inclined rod 36 rotate around a hinge until ends thereof away from the hinge gradually approach downward. This structure is convenient to fold, improves the overall structural strength and folding stability of the side frame, and can meet use requirements of users to the greatest extent.

Further, when the folding cart is in an unfolded state, the front top rod 31, the rear top rod 33 and the upper hinge seat 37 are all transversely arranged. When the folding cart is folded from an unfolded state to a folded state, the front top rod 31 and the rear top rod 33 are vertically arranged, and the upper hinge seat 37 is kept transversely arranged. This structure improves the folding stability of the folding cart.

As a preferred implementation, a front sliding seat 351 is hinged to a lower end of the front inclined rod 35, and the front sliding seat 351 is sleeved on the front bottom rod 32 and can slide along the front bottom rod. With the arrangement of the front sliding seat 351, the front inclined rod 35 can slide in a length direction of the front bottom rod 32, thereby improving the stability of folding deformation. Of course, this sliding mode may also be selected for sliding fit between a lower end of the front supporting rod 3a and the front bottom rod 32, or a sliding groove is provided on the front bottom rod 32, while a sliding portion capable of sliding along the sliding groove is arranged at the bottom of the front supporting rod 3a. In this way, the purpose of slidably folding the front supporting rod 3a in the length direction of the front bottom rod 32 can be also achieved, thereby improving the stability of folding deformation.

As a preferred implementation, a rear sliding seat 361 is hinged to a lower end of the rear inclined rod 36, and the rear sliding seat 361 is sleeved on the rear bottom rod 34 and can slide along the rear bottom rod. With the arrangement of the rear sliding seat 361, the rear inclined rod 36 can slide in a length direction of the rear bottom rod 34, thereby improving the stability of folding deformation. Of course, this sliding mode may also be selected for sliding fit between a lower end of the rear supporting rod 3b and the rear bottom rod 34, or a sliding groove is provided on the rear bottom rod 34, while a sliding portion capable of sliding along the sliding groove is arranged at the bottom of the rear supporting rod 3b. In this way, the purpose of slidably folding the rear supporting rod 3b in the length direction of the rear bottom rod 34 can be also achieved, thereby improving the stability of folding deformation.

Further preferably, as shown in FIGS. 1 and 3, when the folding cart is in an unfolded state, the front supporting rod 3a is vertically connected between the front inclined rod 35 and the front bottom rod 32, and the rear supporting rod 3b is vertically connected between the rear inclined rod 36 and the rear bottom rod 34. When the folding cart is unfolded, the front supporting rod 3a and the rear supporting rod 3b are vertically arranged, so that the supporting strength for supporting the front inclined rod 35 and the rear inclined rod 36 can be improved in a vertical state, thereby further improving the overall structural strength of the side frame.

As a further preferred implementation, a rear end of the front bottom rod 32 is hinged to the front side of the rear bottom rod 34, and when the folding cart is in an unfolded state, the front side of the rear bottom rod 34 abuts against an upper side surface of the front bottom rod 32. With this structure, when the folding cart is the unfolded state, the front bottom rod 32 and the rear bottom rod 34 can be transversely arranged at the same level, thereby improving the overall structural strength of the side frame.

The above descriptions are merely preferred implementations of the present invention. It should be noted that those of ordinary skill in the art may further make several improvements and variations without departing from the principle of the present invention, and such improvements and variations should be also deemed as falling within the protection scope of the present invention.

What is claimed is:

1. A folding cart, comprising: a front frame and a rear frame that are arranged in a front-rear manner and a side frame arranged therebetween for unfolding and folding, wherein the side frame comprises a front top rod, a front bottom rod, a rear top rod and a rear bottom rod, front ends of the front top rod and the front bottom rod are pivoted to an upper side and a lower side of the front frame respectively, rear ends of the rear top rod and the rear bottom rod are pivoted to an upper side and a lower side of the rear frame respectively, a rear side of the front top rod is pivoted to a front side of the rear top rod, and a rear side of the front bottom rod is pivoted to a front side of the rear bottom rod; and characterized in that: the side frame further comprises a front inclined rod and a rear inclined rod;
   an upper end of the front inclined rod is hinged between the front top rod and the rear top rod, and a lower end thereof is slidably connected to the front frame or the front bottom rod; and
   an upper end of the rear inclined rod is hinged between the front top rod and the rear top rod, and a lower end thereof is slidably connected to the rear frame or the rear bottom rod.

2. The folding cart according to claim 1, characterized in that: the side frame further comprises a front supporting rod and a rear supporting rod;
   an upper end of the front supporting rod is hinged to a middle portion of the front inclined rod, and a lower end thereof is slidably connected to the front bottom rod; and
   an upper end of the rear supporting rod is hinged to a middle portion of the rear inclined rod, and a lower end thereof is slidably connected to the rear bottom rod.

3. The folding cart according to claim 1, characterized in that: further comprises an upper hinge seat arranged between the front top rod and the rear top rod, wherein a front end of the upper hinge seat is hinged to a rear end of the front top rod, a rear end of the upper hinge seat is hinged to a front end of the rear top rod, and the upper ends of the front inclined rod and the rear inclined rod are hinged to the upper hinge seat.

4. The folding cart according to claim 3, characterized in that: a connecting member is arranged on a lower side of the upper hinge seat, and the upper hinge seat is hinged to the upper ends of the front inclined rod and the rear inclined rod through the connecting member.

5. The folding cart according to claim 4, characterized in that: the connecting member is inversely T-shaped, and a front end of the connecting member is hinged to the upper end of the front inclined rod, and a rear end thereof is hinged to an upper end of the rear top rod.

6. The folding cart according to claim 4, characterized in that: the upper ends of the front inclined rod and the rear inclined rod are sequentially hinged to a middle portion of the upper hinge seat.

7. The folding cart according to claim 3, characterized in that: when the folding cart is folded from an unfolded state to a folded state, the upper ends of the front inclined rod and the rear inclined rod rotate around a hinge until ends thereof away from the hinge gradually approach downward.

8. The folding cart according to claim 3, characterized in that: when the folding cart is unfolded from a folded state to an unfolded state, the upper ends of the front inclined rod and the rear inclined rod rotate around a hinge until ends thereof close to the hinge gradually move away upward.

9. The folding cart according to claim 3, characterized in that: when the folding cart is in an unfolded state, the front top rod, the rear top rod and the upper hinge seat are all transversely arranged.

10. The folding cart according to claim 3, characterized in that: when the folding cart is folded from an unfolded state to a folded state, the front top rod and the rear top rod are vertically arranged, and the upper hinge seat is kept transversely arranged.

11. The folding cart according to claim 1, characterized in that: a front sliding seat is hinged to a lower end of the front inclined rod, and the front sliding seat is sleeved on the front bottom rod and is capable of sliding along the front bottom rod; and a rear sliding seat is hinged to a lower end of the rear inclined rod, and the rear sliding seat is sleeved on the rear bottom rod and is capable of sliding along the rear bottom rod.

12. The folding cart according to claim 2, characterized in that: when the folding cart is in an unfolded state, the front supporting rod is vertically connected between the front inclined rod and the front bottom rod, and the rear supporting rod is vertically connected between the rear inclined rod and the rear bottom rod.

13. The folding cart according to claim 3, characterized in that: a cross section of the upper hinge seat is inversely n-shaped, and a front side and a rear side of the upper hinge seat are sleeved on end portions of the front top rod and the rear top rod respectively.

14. The folding cart according to claim 2, characterized in that: the front supporting rod is vertically connected between the front inclined rod and the front bottom rod, the rear supporting rod is vertically connected between the rear inclined rod and the rear bottom rod, and when the folding cart is unfolded, the front supporting rod and the rear supporting rod are vertically arranged.

15. The folding cart according to claim 2, characterized in that: a rear end of the front bottom rod is hinged to the front side of the rear bottom rod, and when the folding cart is in an unfolded state, the front side of the rear bottom rod abuts against an upper side surface of the front bottom rod.

\* \* \* \* \*